(12) United States Patent
Blauth

(10) Patent No.: US 11,220,402 B2
(45) Date of Patent: Jan. 11, 2022

(54) BELT CONVEYOR, PARTICULARLY A WEIGHING BELT CONVEYOR

(71) Applicant: Wipotec GmbH, Kaiserslautern (DE)

(72) Inventor: Thorsten Blauth, Katzweiler (DE)

(73) Assignee: Wipotec GmbH, Kaiserslautern (DE)

( * ) Notice: Subject to any disclaimer, the term of this patent is extended or adjusted under 35 U.S.C. 154(b) by 0 days.

(21) Appl. No.: 16/966,412

(22) PCT Filed: Feb. 1, 2019

(86) PCT No.: PCT/DE2019/100105
§ 371 (c)(1),
(2) Date: Oct. 12, 2020

(87) PCT Pub. No.: WO2019/149322
PCT Pub. Date: Aug. 8, 2019

(65) Prior Publication Data
US 2021/0053765 A1    Feb. 25, 2021

(30) Foreign Application Priority Data
Feb. 2, 2018   (DE) .......................... 202018100599.5

(51) Int. Cl.
*B65G 23/44*    (2006.01)
(52) U.S. Cl.
CPC .................... *B65G 23/44* (2013.01)
(58) Field of Classification Search
CPC ..................................................... B65G 23/44
(Continued)

(56) References Cited

U.S. PATENT DOCUMENTS 1,709,549 A * 4/1929 Webber ................ A01D 61/006
198/813
4,173,904 A * 11/1979 Repetto .................... C14B 1/34
198/807

(Continued)

FOREIGN PATENT DOCUMENTS

DE   3143937 A1   7/1982
DE   19618506 C2   9/1998
(Continued)

OTHER PUBLICATIONS

PCT/DE2019/100105 International Search Report dated Jun. 3, 2019.
(Continued)

*Primary Examiner* — James R Bidwell
(74) *Attorney, Agent, or Firm* — The Culbertson Group, P.C.

(57) ABSTRACT

A belt conveyor, particularly a weighing belt conveyor includes a frame constructed from at least one side member and at least one cross member or from a supporting plate. Two rollers are mounted on the frame, with an endless belt located around the two rollers whereby the two rollers are mounted in such a way that they can be moved relative to each other in the conveyance direction. At least one adjustment device is provided on the frame for adjusting the separation between the two rollers. The adjustment device includes a rotatable adjusting component, the axis of rotation S of which lies obliquely above or obliquely below the conveyor level at an angle greater than 0° and less than 90°, in order to make an adjustment to the belt tension possible even after the endless belt has been installed.

19 Claims, 5 Drawing Sheets

(58) Field of Classification Search
USPC .......................................................... 198/816
See application file for complete search history.

(56) References Cited

U.S. PATENT DOCUMENTS

| | | | | |
|---|---|---|---|---|
| 4,561,538 A | * | 12/1985 | Zwiebel | ................ B65G 23/44 |
| | | | | 198/816 |
| 5,101,980 A | | 4/1992 | Arvidson | |
| 5,186,313 A | | 2/1993 | Denker | |
| 5,947,264 A | | 9/1999 | Eltvedt | |
| 6,112,884 A | * | 9/2000 | Voorhees | ........... B65H 29/6618 |
| | | | | 198/813 |
| 6,478,161 B2 | * | 11/2002 | Howell | ................ B65G 21/06 |
| | | | | 209/219 |
| 2002/0029998 A1 | | 3/2002 | Howell | |

FOREIGN PATENT DOCUMENTS

| | | |
|---|---|---|
| DE | 20321780 U1 | 1/2010 |
| DE | 102007017628 B4 | 4/2012 |
| GB | 1240123 A | 11/1968 |

OTHER PUBLICATIONS

DE 202018100599.5 Office action issued by the German Patent Office dated Sep. 5, 2018.

\* cited by examiner

BELT CONVEYOR, PARTICULARLY A WEIGHING BELT CONVEYOR

TECHNICAL FIELD OF THE INVENTION

The invention relates to a belt conveyor, particularly a weighing belt conveyor for material that is to be conveyed, with an arrangement for adjusting the tension of the belt.

BACKGROUND OF THE INVENTION

Belt conveyors with non-flexible belts or belts which are only slightly flexible generally have a belt tensioning device. This is used to tension the conveyor belt, which is normally endless and extends over at least two rollers, and the conveyor belt is usually driven by a drive shaft (or a tractor drive).

Moving one of the rollers on both lateral bearing positions separately in the direction of conveyance to tension the belt and adjust the directional stability is known from DE 196 18 506 C2. This procedure is done during the manufacture of the conveyor but can also be necessary when working on site if, for instance, aging or temperature effects change the directional stability or belt tension to an undesirable degree.

As well as the mechanical movement of the bearing position(s) of only a few millimeters or centimeters, depending on the size of the belt, when tensioning the belt, a significantly larger adjustment movement is necessary during the installation of the belt onto the rollers or the removal of the belt from the rollers.

A lateral protective guard which prevents access to the belt along its entire side is required on many conveyors to protect operators. As a result, the known and typical access points on the side for the adjusting device of the bearing positions are no longer accessible, as a result of which adjustment of large conveyors installed in on-site operation in transportation routes or in large machines is only possible after dismantling the lateral protective covers. However, this operation prejudices safety, especially as adjustment is only possible when shafts are rotating (preferably at maximum speed).

In addition, if several conveyors are placed close to each other in rows, a lateral adjustment mechanism is no longer accessible without dismantling major parts of the plant.

As, in general, further belt conveyors connect with one belt conveyor, especially a weighing belt conveyor, the access points from the front for the adjustment device for the bearing positions are no longer accessible.

SUMMARY OF THE INVENTION

An object of the invention is therefore to create a belt conveyor, and particularly a weighing belt conveyor, with an adjustment device which enables the belt tension to be adjusted without prejudicing safety even after installation of the endless belt.

Aspects of the invention include a belt conveyor, particularly a weighing belt conveyor with a tension adjustment device as well as an adjustment device which may be used in a belt conveyor.

In accordance with the aspects of the invention, an adjustment device includes an adjusting component, the rotational axis of which with reference to the conveyor level lies from obliquely above or below at an angle greater than 0° and smaller than 90°. This position of the adjusting component allows an adjustment (setting the tension of the endless belt as well as the directional stability) even after the installation of the endless belt, and without the dismantling of lateral protective devices being necessary.

An adjustment device in accordance with the present invention is operated from obliquely above or below by means of suitable tools, for example socket wrenches, hexagon socket wrenches, screwdrivers, etc., which rotate the rotatable adjusting component (for example a bolt, spindle or eccentric tappet).

Within the context of the overall description and the claims of this invention, the term "endless belt" is to be understood as being able to encompass both belts which are manufactured as endless, e.g. endlessly injection molded belts, as well as belts joined together at one or more seams, e.g. welded belts.

In addition and in terms of the invention, the term "endless belt" stands for all types of circulating belts such as cords, chains, belts, tractor belts, particularly with lateral guide cavities, groups of individual belts, with the result that the term "endless belt" is, in particular, not restricted to a single, continuous belt.

By using adjustment device in accordance with the invention, the distance of two rollers which are arranged in the direction of conveyance at the ends of the supporting plate or at the ends of at least one side member can be set at a (linear) dimension necessary for tensioning the belt, particularly the carrying run of the belt. Conveyors, of course, can include rollers in addition to the aforementioned (end) rollers, especially for guidance of the belt, without this inclusion impairing the effect according to the invention of the adjustment of the displacement path and therefore the belt tension.

In terms of the invention, the term "supporting plate" is to be understood as any type of thick (also hollow) and thin plates, even if plates of this nature have no side members. As used in the accompanying claims the term "frame" thus encompasses a supporting plate.

The adjustment device can be positioned at one end of the plate or at the end of at least one side member or inside this side member (dividing the latter or also in telescopic form).

In terms of the invention, the term "roller" includes not only a continuous roller body but also several roller bodies arranged along an (interrupted or continuous) axis sometimes at a distance from each other and acting as a roller.

In a further development of the invention, the rotational axis of the adjusting component lies perpendicular to the roller axis with the result that activation of the adjusting component is neither prejudiced by a potentially elevated belt or its edge nor by any existing high lateral cover, the height of which extends vertically beyond the adjusting component up to the conveyor level, that is, the level of the top flight of the endless belt.

In some embodiments of the invention, the adjustment device (with or without transmission) takes the form of a wedge drive with an output component on the output end which operates in the direction of a displacement path in which the roller is to be displaced. Such an adjustment device also includes an adjusting component formed as a drive side component which engages with and transmits power to the output component at the output end at an angle greater than 0° and smaller than 90°, preferably smaller than 45°, in particularly smaller than or equal to 30°, and is essentially perpendicular to the roller axis.

By this construction it is possible to achieve a displacement by the adjustment device in a simple manner, preferably with a gear reduction, during which other types of displacement (spindle with a flexible shaft or a cardan joint, etc.) are, also of course, conceivable.

In further embodiments of the invention, the wedge drive has an operative surface or slope which is wedge-shaped in cross section (along the direction of the displacement path) with an angle smaller than or equal to 45°, preferably smaller than or equal to 30°. The operative wedge shape in this arrangement can be positioned at the relevant end of the drive side component or output component or at both ends, with the result that a greater displacement path of the drive side component achieves a smaller displacement path of the second, output component.

The wedge shape and size of the effective angle can, of course, be selected depending on the elasticity of the endless belt. In this way, a greater angle and therefore a greater potential displacement path of the second, output end component can be selected. However, a greater displacement path can also be required by the extension of an older belt caused by wear, with the result that this circumstance can be taken into account by exchanging the self-contained adjustment device (module) in this particular embodiment of the invention.

In some embodiments of the invention, the frame for the conveyor is constructed from two side members and two cross beams in which two adjustment devices are arranged at the ends of the side members. This design enables the required stability to be achieved particularly for a weighing belt conveyor in spite of a low self-weight (particularly to make a rapid transient oscillation possible). It is also conceivable to arrange a supporting plate at or on the side member and cross beam frame to support the upper run of the endless belt carrying the goods; this arrangement also further increases the stability of the frame structure.

As already indicated above, an adjustment device within the scope of the present invention can be designed as a free-standing module and can have supplementary fixing devices with serve as an attachment arrangement for connecting the adjustment device securely with the frame.

Embodiments of the invention may use side struts as side members which consist of extruded sections cut to length according to the required length of the belt (preferably aluminium extruded profiles). Two free-standing modules can then be fixed in position at two ends of the side members, for example by means of bolts in which the holes needed for this can advantageously be drilled in advance in the extruded profile. If need be, threads can be cut in the holes; self-tapping bolts can also be used to secure the module.

In some embodiments of the invention, the adjustment device designed as a free-standing module connects the side members and cross beams of the frame located next to each other together; this also makes a further, advantageous simplification of the design and installation possible. The connection of the two modules with the ends of a cross beam can be made in the same way as described above for the side member, with the result that the cross beams, too, can be advantageously made from extruded profiles (preferable aluminium extruded profiles) cut to length to suit the required belt width.

An adjustment device constructed as a free-standing module may lie solely between the frame and roller or their bearings so that the force from the frame to the roller is transmitted only via the module and, at best, the roller bearing. In this case, the roller bearing can also be integrated into the module.

In order to achieve a secure connection with the frame or plate it is advantageous for the adjustment device designed as a free-standing module according to the invention to have supplementary fastenings, for example at least one guide bolt, holes for bolts etc., so that it can be simply and rapidly installed, replaced or retrofitted on site or during use.

The various embodiments of the invention make it advantageous and possible for the adjustment device to be operated from above or below independently of each other such device without it being necessary to dismantle lateral protective devices or to dismantle belt conveyors located next to each other.

An adjustment device according to the present invention also makes a relatively large displacement path possible (for example 25 mm in the heavy duty sector) in the direction of conveyance in order to simplify the installation/removal of the endless belt. Nevertheless, the invention also makes fine adjustment possible so that it is possible to adjust the directional stability of the belt.

The provision of an adjustment device as in the invention generates little additional weight so that the invention can also be used as a weighing belt conveyor or be used in weighing belt conveyors, in which, as is well known, as low a preload as possible on the weighing sensor is desired in order to make the transient oscillation as rapid as possible.

In the embodiment as a free-standing module, an adjustment device according to the invention can also be used in existing belt conveyor designs and retrofitted into existing modular systems without materially increasing the number of variants of the basic module.

These and other advantages and features of the invention will be apparent from the following description of representative embodiments, considered along with the accompanying drawings.

DESCRIPTION OF REPRESENTATIVE EMBODIMENTS

Figure 1:
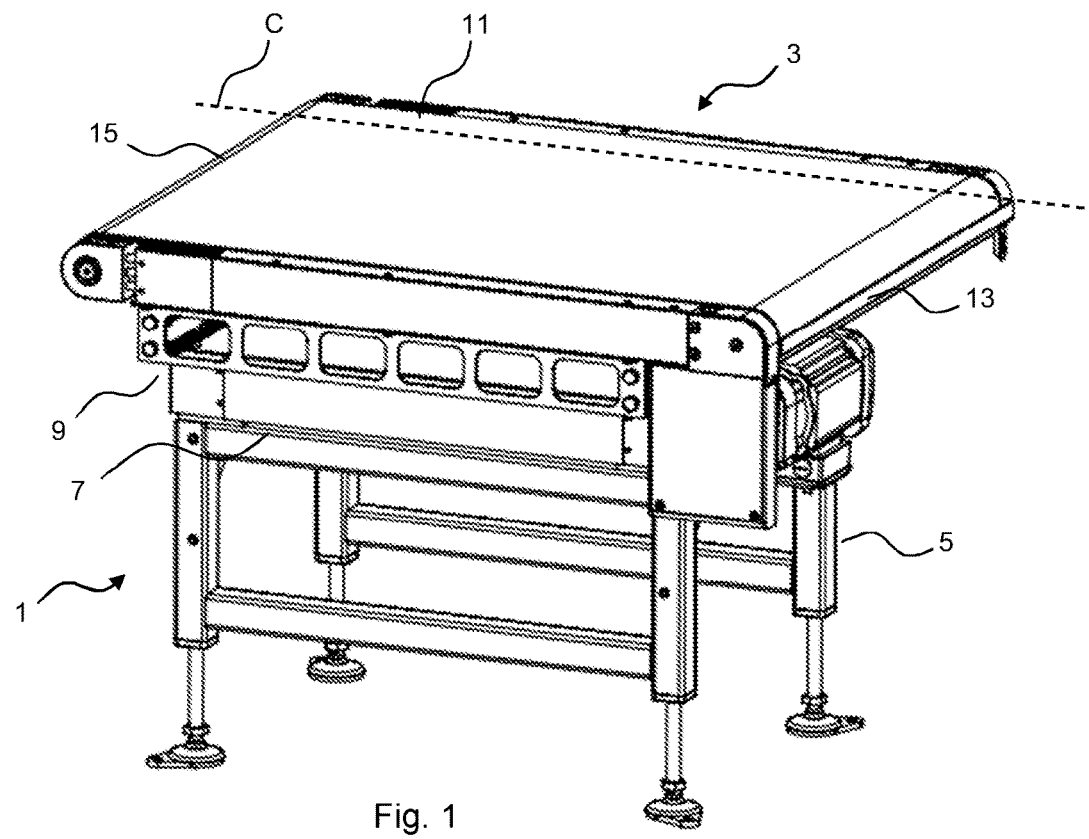
FIG. 1 is a perspective view of a weighing belt conveyor with an adjustment device according to the invention.

The weighing belt conveyor 1 shown in FIG. 1 includes a supporting table 5 and a table frame, a weighing cell 7 and a weighing overlay 3 or a weighing platform in the form of a belt conveyor which, overall, lies for example over its supporting part 9, on the weighing cell 7, or is placed over the foregoing. A signal of the weighing cell 7, which is determined by the weight of the preload of the belt conveyor 3 and goods located on the belt conveyor 3 or its endless belt 11, is transmitted to an evaluation and control unit which is not represented, and which calculates the weight from the signal from the weighing cell.

The belt conveyor 3 includes a rectangular frame formed from cross beams 31a, 31b (see FIG. 5) and side members 21a, 21b, onto the face sides of which rollers 13 and 15 are arranged in the direction of conveyance (indicated by dashed line C in FIG. 1) by means of roller bearings 13a, 13b and 15a, 15b, with the rollers being rotatable around a roller axis R. An endless belt 11 is positioned around these rollers 13, 15.

Figure 2:
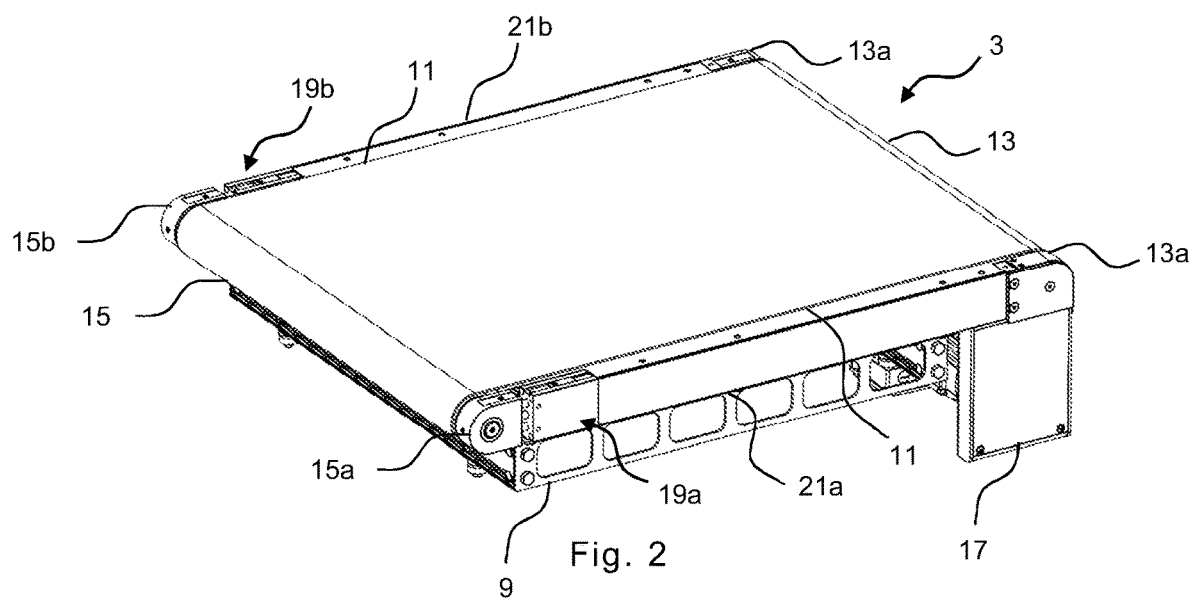
FIG. 2 is a detailed perspective view of a weighing overlay (in the form of a conveyor belt) of the weighing belt conveyor according to FIG. 1.

As can be seen in FIG. 2, the roller 13 is powered by a drive 17 in order to create a conveyor movement; the way the roller is powered is not presented in detail.

In order to regulate a desired and necessary belt tension on the endless belt 11, two adjustment devices in the form of tensioning blocks 19a and 19b are arranged in the frame at the sides of the undriven roller 15 between the two ends of the side members 21a and 21b and the associated roller bearings 15a and 15b.

Figure 3:
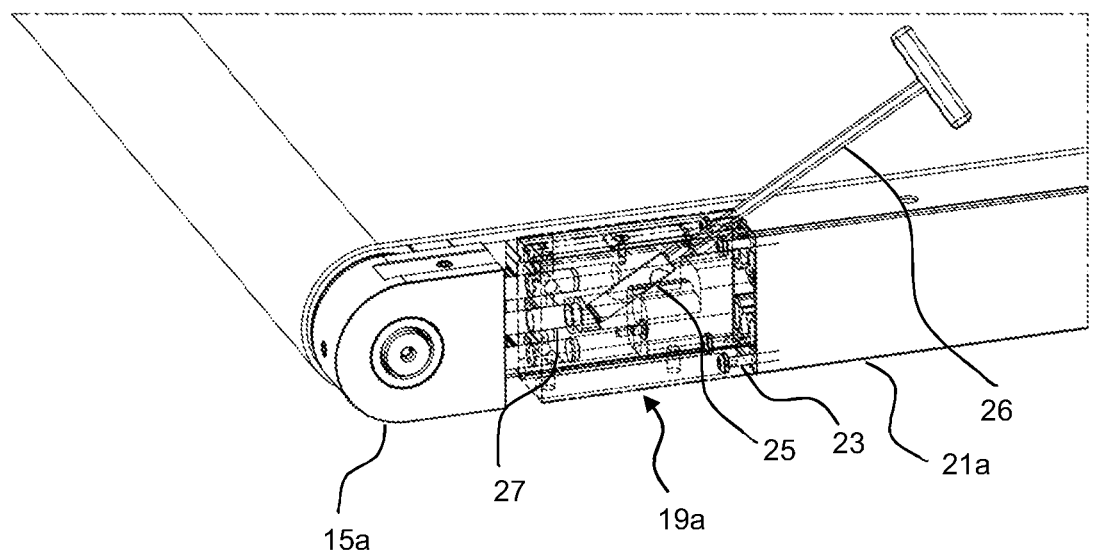
FIG. 3 is a partially exploded, enlarged perspective view of an adjustment device according to FIG. 2.
Figure 4:
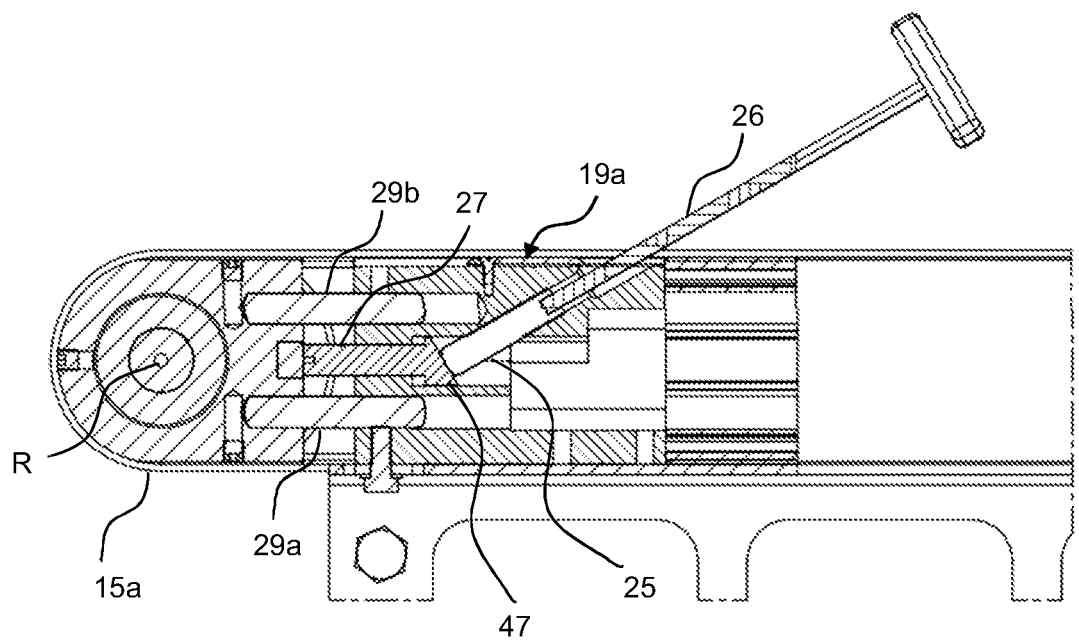
FIG. 4 is an exploded side view of the adjustment device according to FIG. 3.

As can be seen in FIG. 3 and FIG. 4, the adjustment device 19a (and in the same way, the preferably symmetrical or even identical adjustment device 19b as depicted) is secured to the face end of the side member 21a, for example by four bolts 23. The roller bearing 15a is positioned on the opposite side of the adjustment device 19a and the longitudinal direction of the side member 21a so that it is moveable (only) in the conveying direction.

Figure 7:
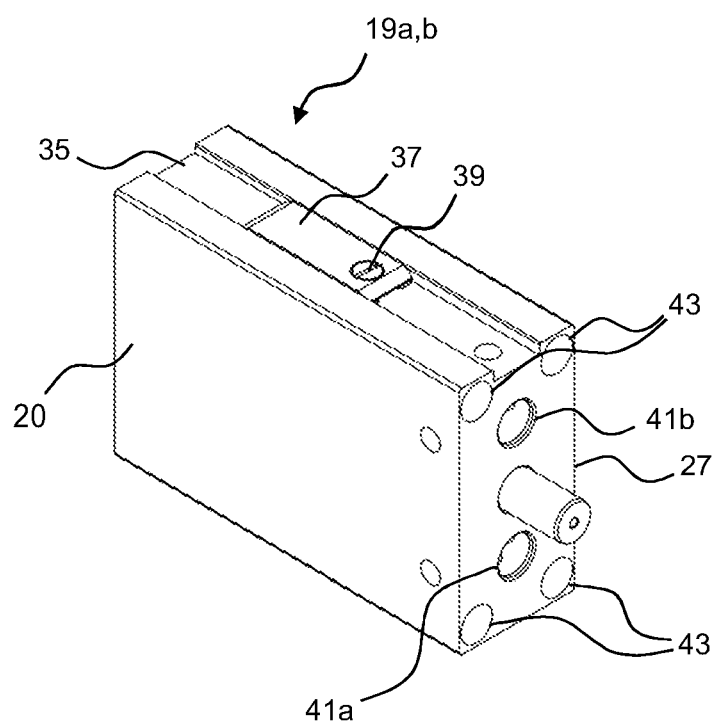
FIG. 7 is a perspective view of a separate adjustment device.
Figure 8:
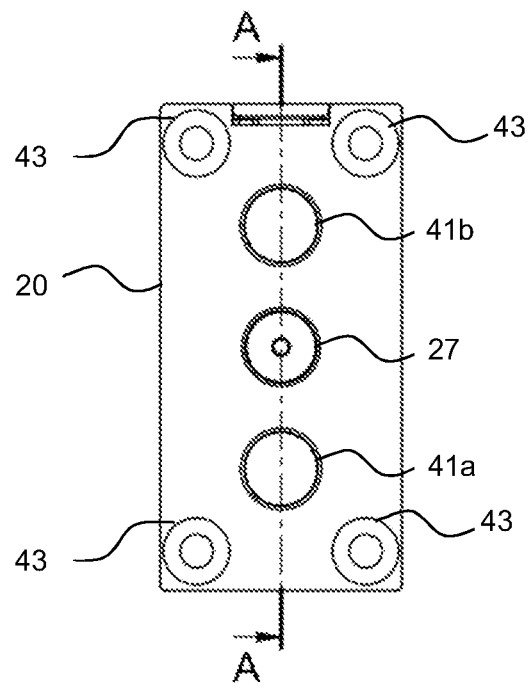
FIG. 8 is a front view of an adjustment device according to FIG. 7.
Figure 9:
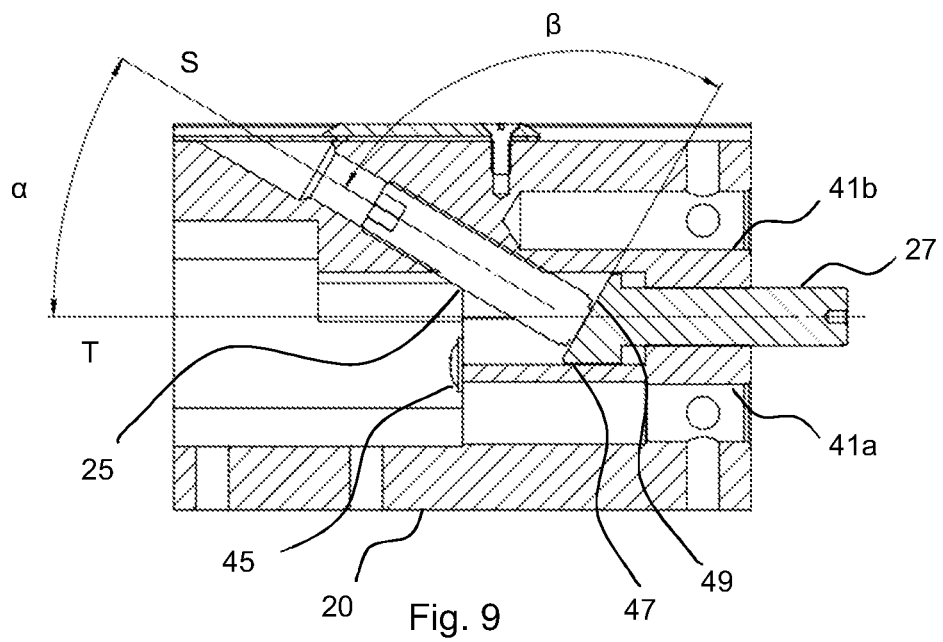
FIG. 9 is a sectional view of an adjustment device along the line A-A in FIG. 8.

For this purpose, the adjustment device 19a, as can be seen in FIG. 7 to FIG. 9, has holes 41a, 41b in the longitudinal direction in which guide bolts 29a, 29b, projecting from the roller bearing 15a (as shown in FIG. 4), engage in the longitudinal direction. These holes 41a, 41b represent a guide arrangement for mounting the roller bearing 15a on the adjustment device 19a and the guide bolts enable displacement of the roller bearing 15a and thus roller 15 in the longitudinal direction and in the conveyance direction with respect to the adjustment device 19a and side member 21a. The guide hole and guide bolt arrangement also prevents the roller bearing 15a and therefore the roller 15 from moving in undesired directions (including rotational movements).

A tensioning rod 27 is positioned in the adjustment device, preferably in the middle and central to the surface of the face of the tensioning block 19a, 19b; this tensioning rod 27 can be moved in the conveyance direction in order to tension the endless belt or to release the tension, for example for dismantling purposes.

As shown in FIG. 3, FIG. 4 and particularly FIG. 9, this tensioning rod 27 represents the output side component of a wedge drive which is directed and moveable in the tensioning block 19a, 19b in a corresponding hole in the longitudinal direction. In the interior of the tensioning block 19a, 19b, the end of the tensioning rod 27 has a preferably enlarged wedge shape in its cross section (as best shown in FIG. 9), on the final chamfer or wedge surface 49 of which drive side component in the form of a ball end thrust screw 25 engages preferably perpendicularly to it ($\beta=90°$).

This ball end thrust screw 25 can be screwed further in (in a tensioning direction of rotation) or out in a corresponding hole with an internal thread by means of the screwing movement of a socket wrench 26 which can be inserted into its head (for example Inbus®, Torx®, etc.) so that the tensioning rod 27 can be correspondingly pushed forward (tensioning the belt 11) or backward (releasing the tension of the belt) over the wedge surface. Even if no additional springs should be provided on the tensioning rod 27 in the tensioning block 19a, 19b, the backward movement of the tensioning rod 27 is produced by the elasticity (relaxation of the tension) of the belt 11.

As shown in FIG. 9, the ball end thrust screw 25 engages with the corresponding wedge 47 of the tensioning rod 27 preferably perpendicularly and therefore at an angle $\alpha$ to the conveyance direction (and direction of the displacement path of tensioning rod 27). In this case, the effective angle of the wedge surface 49 (relative to an axis perpendicular to the conveyance level) which is responsible for the amount of the reduction corresponds to the angle $\alpha$ of the axis of rotation S of the ball end thrust screw 25 to the conveyance direction and center line T of the tensioning rod 27.

In the embodiment which is depicted, the angle $\alpha$ is 30°, whereby, of course, other angles are possible depending on the required displacement path of the tensioning rod 27 and corresponding to the magnitude of the elasticity of the belt 11. A bolt 45 acts as a securing device to prevent the backward movement of the tensioning rod 27 past a desired point.

As indicated particularly in FIGS. 7-9 the tensioning blocks (adjustment devices) 19a and 19b may each be formed as a self-contained module. Each module includes an adjustment device module structure 20 on which the thrust screw (adjusting component, drive side component) 25 and tensioning rod (output component) 27 are each mounted. Holes 43, which provide a securing arrangement for securing the respective device 19a or 19b to the desired frame part of the frame, are also included on the adjustment device module structure 20.

Figure 5:
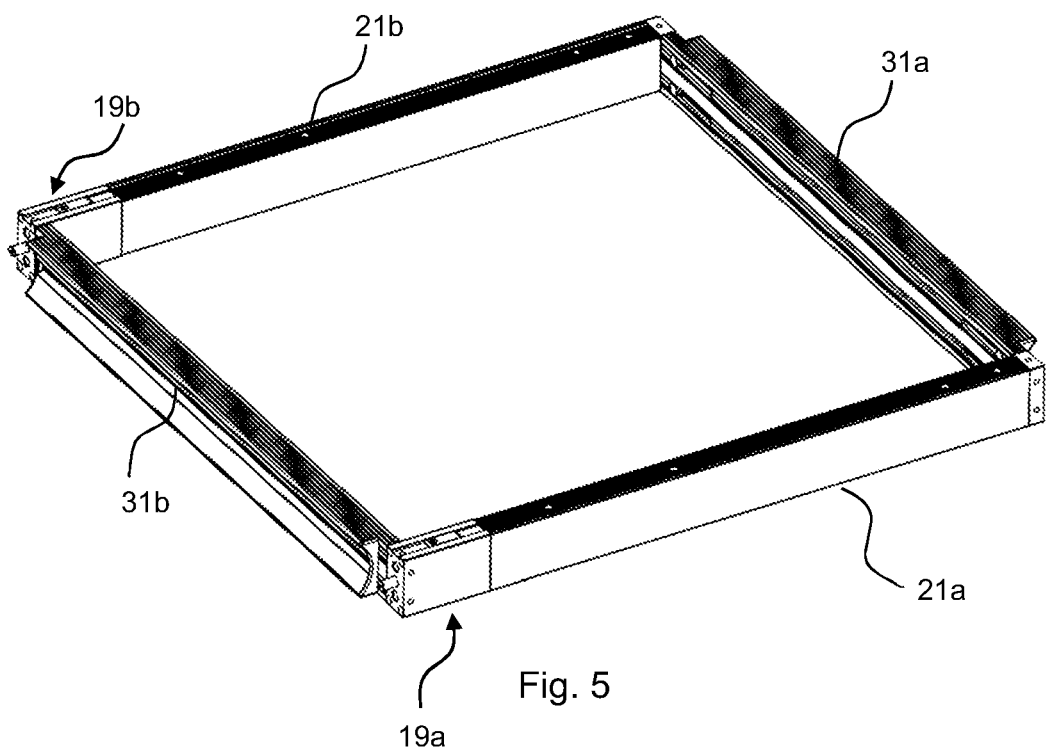
FIG. 5 is a perspective view of a frame.

As depicted in FIG. 5, the tensioning blocks 19a and 19b act preferably also as the connection to the cross beam 31b which can also act as the connection to the side members 21a and 21b by means of bolts. This layout advantageously increases the stability of the arrangement of the tensioning blocks 19a, 19b.

The side members 21a and 21b are connected with the ends of the cross beam 31a and with each other at the opposite corners by means of blocks (like the tensioning blocks 19a, 19b also made from a stronger material, e.g. steel) and form a frame. Unlike the blocks and the tensioning blocks 19a, 19b, the side members 21a, 21b and cross beams 31a, 31b in the form of struts are made from extruded aluminium profiles which are cut to length depending on the required length and width of the belt. In this way, a modular construction of the frame (including the rollers 13 and 15) with integral displacement and belt adjustment mechanism (belt tension and directional stability) is possible.

All the struts (side members and cross beams) in the form of extruded profiles may be cut to length so that advantageously all machining is done on the tensioning blocks 19a, 19b.

Figure 6:
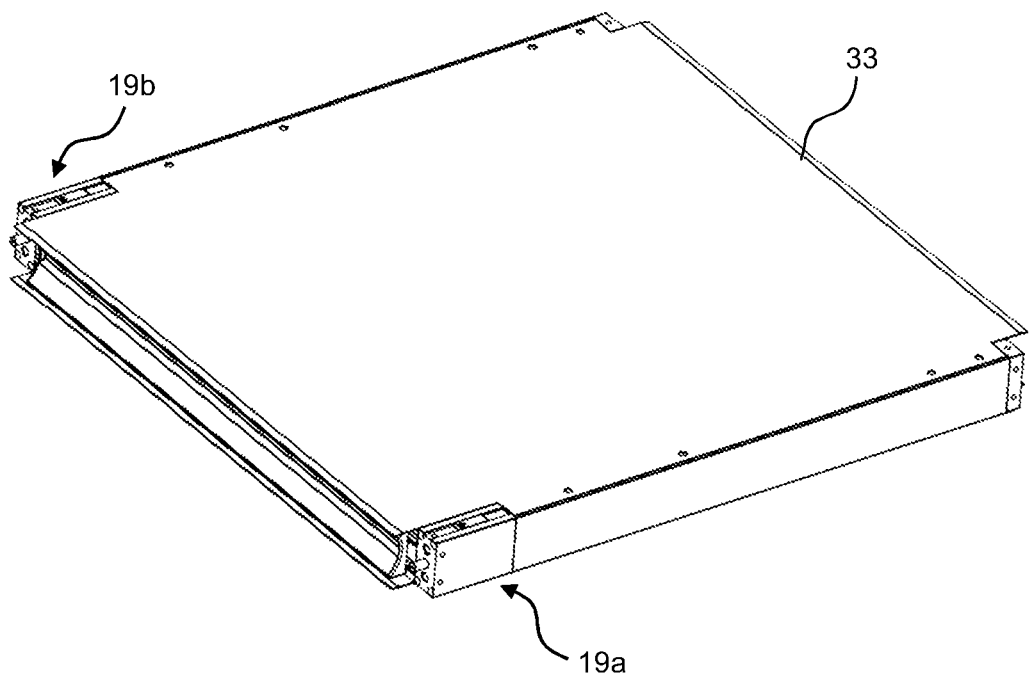
FIG. 6 is a view of a frame according to FIG. 5 with an additional supporting plate.

In addition and as can be seen in FIG. 6, a thin supporting plate can be secured on the frame structure, for example with bolts, to support an upper run of the endless belt 11 carrying the material to be conveyed; this plate also further increases the stability of the frame.

In order to prevent an accumulation of dirt in the upper opening of the tensioning block 19a, 19b through which a socket wrench can be inserted to adjust the displacement path of the tensioning rod 27, this opening is closed by a cover plate 35 or a dirt cover, as depicted in FIG. 6. To expose the opening, a bolt 39 of a clamping plate 37 is released so that the cover plate 35 is moved further in under the clamping plate 37 in the longitudinal direction T and uncovers the access to the ball end thrust screw 25.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, vertical, and the like with reference to a given feature are made with reference to the orientation of the structures shown in the drawings and are not intended to exclude other orientations of the structures.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

LIST OF REFERENCE CHARACTERS

1 Weighing belt conveyor
3 Weighing overlay in the form of a belt conveyor
5 Supporting table
7 Weighing cell
9 Supporting part
11 Endless belt
13 Driven roller
13a Roller bearing
13b Roller bearing
15 Roller
15a Roller bearing
15b Roller bearing
17 Drive
19a Adjustment devices, adjustment modules in the form of a tensioning block
19b Adjustment devices, adjustment modules in the form of a tensioning block
20 Adjustment device module structure
21a Side members in the form of longitudinal struts
21b Side members in the form of longitudinal struts
23 Bolts
25 Drive end component in the form of a ball end thrust screw
26 Socket wrench
27 Output end component in the form of a tensioning rod
29a Guide bolt
29b Guide bolt
31a Cross beams in the form of transverse struts
31b Cross beams in the form of transverse struts
33 Supporting plate in the form of thin metal sheet
35 Cover plate
37 Clamping plate
39 Bolt
41a Holes for guide bolts
41b Holes for guide bolts
43 Holes for bolts 23
45 Bolt as securing device
47 Wedge
49 Wedge surface or wedge slope
R Roller axis
S Axis of rotation of the adjusting component 25
T Center line of the tensioning rod 27
α Adjusting angle S to T of 30°
β 90° angle from S to wedge surface or wedge slope
C Direction of conveyance

The invention claimed is:

1. A belt conveyor for moving goods, the belt conveyor including:
   (a) a frame made up of at least one side member and at least one cross beam or made up of a supporting plate, the frame defining a first frame end and a second frame end;
   (b) an adjustment device module structure connected to the frame at the first frame end;
   (c) a first roller and a second roller separated from each other in a conveyance direction of the belt conveyor, the second roller being mounted at the second frame end for rotation about a second roller axis, the first roller being mounted for rotation about a first roller axis, the first roller also being mounted on the adjustment device module structure so as to be moveable in the conveyance direction of the belt conveyor with respect to the adjustment device module structure and with respect to the second roller;
   (d) an output end component mounted on the adjustment device module structure for movement along a displacement path with respect to the adjustment device module structure;
   (e) a drive side component mounted on the adjustment device module structure for rotation about a drive side component axis of rotation, the rotation about the drive side component axis of rotation in a tensioning direction of rotation being operable to move the output end component along the displacement path to move the first roller with respect to the second roller to change the distance between the first roller and second roller in the conveyance direction of the belt conveyor, wherein the drive side component axis of rotation lies at an angle greater than 0° and less than 90° obliquely above or obliquely below a displacement path axis defined by the displacement path; and
   (f) an endless belt operatively mounted on the first roller and the second roller so as to define a conveyor surface extending along a conveyor level.

2. The belt conveyor of claim 1 wherein displacement path axis extends parallel to the conveyance direction.

3. The belt conveyor of claim 1 wherein the drive side component axis of rotation is essentially perpendicular to the first roller axis.

4. The belt conveyor of claim 3
wherein the drive side component, when rotated in the tensioning direction of rotation, engages with the output end component at an adjustment engagement angle greater than 0° and smaller than 90° between a longitudinal axis of the drive side component and the displacement path axis.

5. The belt conveyor of claim 4 wherein the adjustment engagement angle is greater than 0° and smaller than 45°.

6. The belt conveyor of claim 4 wherein the adjustment engagement angle is greater than 0° smaller than or equal to 30°.

7. The belt conveyor of claim 4 wherein the output end component includes an elongated rod with a wedge-shaped surface at one end thereof and wherein the drive side component engages with the output end component at the wedge-shaped surface, the wedge-shaped surface of the elongated rod extending at an angle smaller than or equal to 45° with respect to a longitudinal axis of the elongated rod.

8. The belt conveyor of claim 7 wherein the angle of the wedge-shaped surface with respect to the longitudinal axis of the elongated rod is selected depending on an elasticity of the endless belt.

9. The belt conveyor of claim 1 wherein the frame includes a first side member and a second side member spaced apart from each other transverse to the conveyance direction and further includes a first cross beam and a second cross beam separated from each other in the conveyance direction, the adjustment device module structure being located at an end of the first side member, and further including a second adjustment device module structure connected to an end of the second side member at the first frame end with (i) a second output end component mounted on the second adjustment device module structure for movement along a second displacement path with respect to the second adjustment device module structure, and with (ii) a second drive side component mounted on the second adjustment device module structure for rotation about a second drive side component axis of rotation, the rotation about the second drive side component axis of rotation in a second tensioning direction of rotation being operable to move the second output end component along the second displacement path to move the first roller with respect to the second roller in the conveyance direction of the belt conveyor, wherein the second drive side component axis of rotation lies at an angle greater than 0° and less than 90° obliquely above or obliquely below a second displacement path axis defined by the second displacement path.

10. The belt conveyor of claim 9 wherein the frame further includes a belt supporting plate in position to support an upper run of the endless belt.

11. The belt conveyor of claim 9 wherein the adjustment device module structure connects the first side member to the first cross beam and the second adjustment device module structure connects the second side member to the first cross beam.

12. The belt conveyor of claim 1 wherein the adjustment device module structure includes a securing arrangement for connecting the adjustment device module structure to the frame.

13. The belt conveyor of claim 12 wherein the adjustment device module structure lies exclusively between the frame and the first roller.

14. An adjustment device for use in a belt conveyor, the adjustment device including:
(a) an adjustment device module structure;
(b) an output end component mounted on the adjustment device module structure for movement along a displacement path with respect to the adjustment device module structure;
(c) a drive side component mounted on the adjustment device module structure for rotation about a drive side component axis of rotation, the rotation about the drive side component axis of rotation in a tensioning direction of rotation being operable to move the output end component along the displacement path, wherein the drive side component axis of rotation lies at an angle greater than 0° and less than 90° obliquely above or obliquely below a displacement path axis defined by the displacement path;
(d) a guide arrangement included on the adjustment device module structure for mounting a roller bearing of a conveyor belt roller on the adjustment device module structure so that the roller bearing is moveable along the displacement path axis with respect to the adjustment device module structure; and
(e) a securing arrangement included on the adjustment device module structure by which the adjustment device module structure is connectable to a frame of a belt conveyor.

15. The adjustment device of claim 14 wherein the drive side component, when rotated in the tensioning direction of rotation, engages with the output end component at an adjustment engagement angle greater than 0° and smaller than 90° between a longitudinal axis of the drive side component and the displacement path axis.

16. The adjustment device of claim 15 wherein the adjustment engagement angle is greater than 0° and smaller than 45°.

17. The adjustment device of claim 15 wherein the adjustment engagement angle is greater than 0° and smaller than 30°.

18. The adjustment device of claim 14 wherein the output end component includes an elongated rod with a wedge-shaped surface at one end thereof and wherein drive side component engages with the output end component at the wedge-shaped surface, the wedge-shaped surface extending at an angle smaller than or equal to 45° with respect to a longitudinal axis of the elongated rod.

19. The adjustment device of claim 14 wherein the securing arrangement includes a first securing feature by which the adjustment device module structure is connectable to a side member of a conveyor belt frame and a second securing feature by which the adjustment device module structure is connectable to a cross beam of the conveyor belt frame.

\* \* \* \* \*